(12) United States Patent
Martin

(10) Patent No.: US 7,230,749 B2
(45) Date of Patent: Jun. 12, 2007

(54) LIGHT BLOCKING ELECTRICAL INTERCONNECT

(75) Inventor: Eric T. Martin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 266 days.

(21) Appl. No.: 11/061,014

(22) Filed: Feb. 18, 2005

(65) Prior Publication Data

US 2006/0187396 A1 Aug. 24, 2006

(51) Int. Cl.
*G02B 26/00* (2006.01)
*G02F 1/03* (2006.01)
*G02F 1/1343* (2006.01)
*H01L 23/52* (2006.01)

(52) U.S. Cl. .................. 359/291; 359/245; 359/295; 349/139; 257/691

(58) Field of Classification Search ............... 359/245, 359/290, 291, 295; 349/139; 257/691
See application file for complete search history.

(56) References Cited

U.S. PATENT DOCUMENTS

| 4,954,789 | A | 9/1990 | Sampsell |
| 5,312,513 | A | 5/1994 | Florence et al. |
| 5,844,711 | A | 12/1998 | Long, Jr. |
| 6,025,951 | A | 2/2000 | Swart et al. |
| 6,195,196 | B1 | 2/2001 | Kimura et al. |
| 6,396,619 | B1 | 5/2002 | Huibers et al. |
| 6,529,311 | B1 | 3/2003 | Bifano et al. |
| 6,747,785 | B2 | 6/2004 | Chen et al. |
| 7,075,701 | B2 * | 7/2006 | Novotny et al. ............ 359/291 |
| 2004/0008396 | A1 | 1/2004 | Stappaerts |
| 2004/0080807 | A1 | 4/2004 | Chen et al. |
| 2004/0100677 | A1 | 5/2004 | Huibers et al. |

\* cited by examiner

*Primary Examiner*—Ricky Mack
*Assistant Examiner*—William Choi

(57) ABSTRACT

An electrical interconnect to block light for use with an array of micro electromechanical machines separated by the first breaks includes a layer of an electrically conductive and an electrically isolated portions separated by second breaks configured to cross the first breaks on multiple sides of one of the micro electromechanical machines.

29 Claims, 5 Drawing Sheets

LIGHT BLOCKING ELECTRICAL INTERCONNECT

BACKGROUND

Many electronic devices include an array of micro electromechanical machines or MEMs which are controlled by an underlying circuitry layer which may or may not include one or more semi-conductor switching mechanisms such as transistors. In particular devices, such as displays, the underlying circuitry layers may be exposed to high levels of illumination. This illumination may cause the circuitry layer and the electronic device to not perform as intended.

DETAILED DESCRIPTION OF THE EXAMPLE EMBODIMENTS

Figure 1:
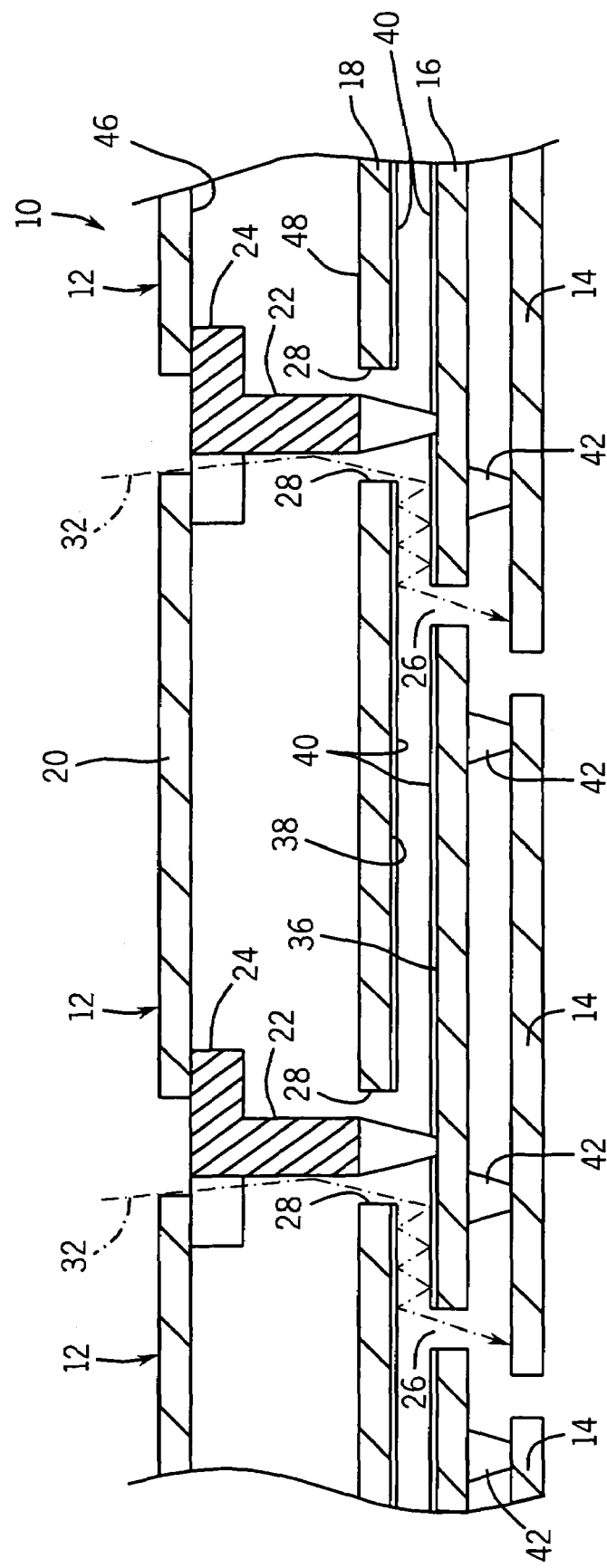
FIG. 1 is a fragmentary sectional view schematically illustrating an electrical device according to one exemplary embodiment.

FIG. 1 is a sectional view schematically illustrating one example of an electrical device 10 including micro-electromechanical system (MEMs) structures 12, electrical circuitry 14 and electrical interconnect layers 16, 18. MEMs structures 12 are configured to perform one or more functions in response to electrical charges or signals generated or transmitted by electrical circuitry 14 and one or both of electrical interconnect layers 16, 18. In the particular example shown, MEMs structures 12 each include a main portion 20 supported relative to layers 16, 18 by one or more posts 22 and movably supported by one or more flexures 24. In other embodiments, MEMs structures 12 generally comprise other forms of micro-electromechanical systems or machines.

Electrical circuitry 14 is spaced from MEMs structures 12 and includes electrical devices for generating and/or transmitting electrical signals or voltages to MEMs structures 12. In one embodiment, electrical circuitry 14 may comprise an active matrix of switching devices, such as transistors or MEMs devices, configured to selectively transmit voltage to MEMs structures 12.

Electrical interconnect layers 16,18 generally comprise layers of one or more light blocking materials disposed between circuitry 14 and MEMs structures 12. Interconnect layers 16,18 include openings 26 and 28, respectively. Openings 26 and 28 serve to electrically isolate portions of layers 16,18 from one another or to facilitate mechanical connection of MEMs structures 12. In the particular example illustrated, openings 26 partition layer 16 into electrically isolated portions. Openings 28 facilitate mechanical and electrical connection of MEMs structures 12 to layer 16.

As further shown by FIG. 1, openings 26 and 28 are configured to cause incident light 32 that may have passed from MEMs structures 12 to travel through indirect paths and to be significantly attenuated prior to reaching circuitry 14. In particular, openings 26 and 28 are physically offset by a sufficient degree so as to substantially prevent direct propagation of light without reflection. In the particular example illustrated, surfaces 36 and 38 of layers 16 and 18, respectively, are further provided with at least one anti-reflective coating 40 to further inhibit reflection.

In addition to attenuating light that may reach circuitry layer 14, electrical interconnect layers 16,18 may further be configured to serve as a capacitor. As shown by FIG. 1, interconnect layer 16 is connected to circuitry layer 14 through electrically conductive vias 42. The arrangement of openings 26 increase the capacitance connected to circuitry 14. Layers 16, 18 further create a capacitor therebetween that may be electrically de-coupled from circuitry 14 by electrically disconnecting layer 16 from circuitry layer 14.

In the particular example illustrated, MEMs structures 12 comprise pixels of semi-transparent or semi-reflective material which are movably supported by flexures 24 relative to electrical interconnect layer 18 so as to form an adjustable optical cavity 46. Electrical interconnect layer 18 is further provided with an upper surface 48 that is reflective. In other embodiments, electrical device 10 may have other forms and configurations.

Figure 2:
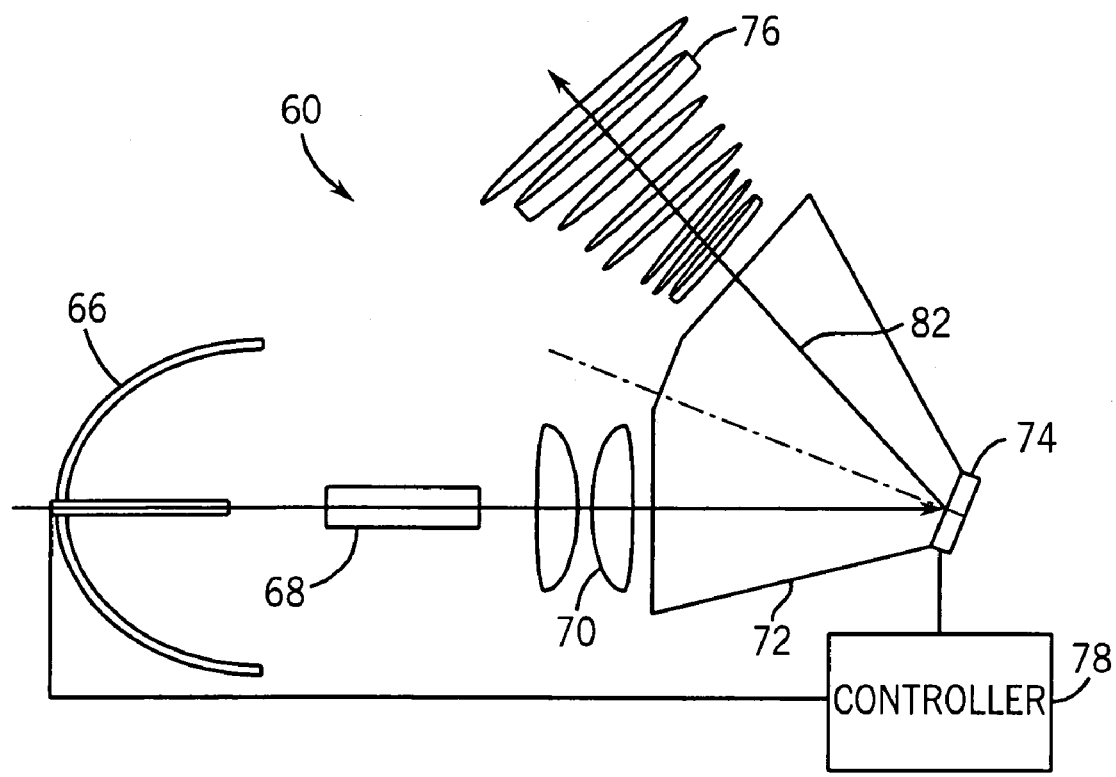
FIG. 2 is a schematic illustration of a display system including a light modulator according to one exemplary embodiment.

FIG. 2 schematically illustrates one specific example of an electronic device (shown as a display system 60) including light modulator 74. In addition to light modulator 74, display system 60 includes light source 66, integrator 68, condenser lens 70, prism 72, projection lens 76 and controller 78. Light source 66 directs light towards modulator 74. Integrator 68 integrates the light. Condenser lens 70 condenses the light such that the light travels through prism 72 and onto modulator 74.

Modulator 74 may comprise a micro-machine light modulator including electrostatically-actuated optical cavities. Modulator 74 varies intensity and color modulation within each of a plurality of pixels. As will be described in greater detail hereafter, each pixel acts as a Fabry-Perot filter including a partial reflecting film, a tunable optical cavity and a strongly reflecting film. By controlling the size of each optical cavity, hues and intensities can be modulated without resorting to color wheels, dedicated pixels for each primary hue or polarized light. Interference from the two reflectors causes a narrow band filter that is used to select primary colors by varying the gap between the reflectors. The gap is controlled by balancing a flexure force and an electrostatic force between the two reflectors. As the gap is narrowed, absorption occurs and a black state can be achieved.

As indicated by arrow 82, light reflected from modulator 74 passes through prism 72 and through projection lens 76. Projection lens 76 comprises a series of one or more optical lenses which focus and direct the light reflected from modulator 74 onto a display surface (not shown).

Controller 78 comprises a processor unit configured to generate control signals to direct the operation of at least light source 66 and modulator 74. For purposes of the disclosure, the term "processor unit" shall mean a conventionally known or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hardwired circuitry may be used in place of or in combination with software instructions to implement the functions described. Controller 78 is not limited to any specific combination of hardware circuitry and software, nor to any particular source for the instructions executed by the processing unit.

In the particular embodiment shown, controller 78 generates control signals based upon received image data. The control signals tune the optical cavities of the individual pixels based upon the image data such that the light reflected from modulator 74 has a hue and intensity matching the image to be displayed. This reflected light is further refined by projection lens 76.

Although modulator 74 is illustrated as being incorporated into a display system 60 which comprises a projector, modulator 74 may alternatively be incorporated into other display systems such as wearable displays, cameras, cell phones, electronic paper, personal data assistants (PDAs), and the like.

Figure 3:
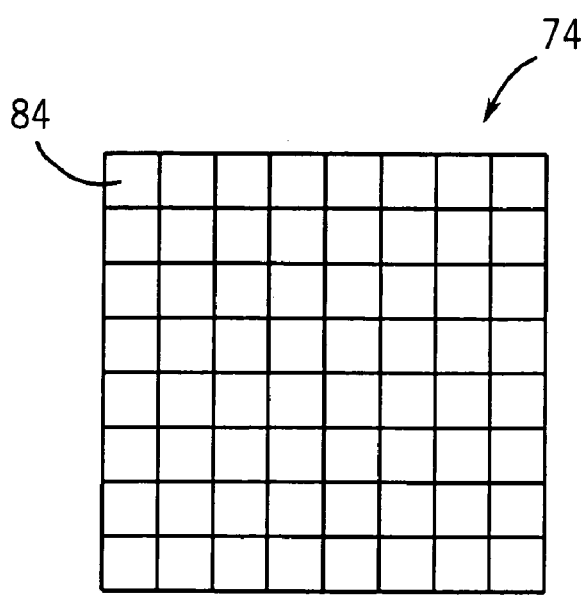
FIG. 3 is a schematic illustration of the light modulator of FIG. 2 according to one exemplary embodiment.

As shown by FIG. 3, light modulator 74 comprises an electronic device which includes an array of cells or pixels 84. FIGS. 4-9 illustrate a portion of pixels 84 according to one exemplary embodiment. As shown by FIG. 8, modulator 74 generally includes circuitry layers 114, electrical interconnect layer 116, conductive plate 118, dielectric 119, pixel plate support 120 and pixel plates 122. Circuitry layers 114 comprise thin film stacks or layers including or forming electrical circuitry such as electronic components and electrical traces connecting such components. In the particular example shown, circuitry layers 114 form one or more electrical switching devices 124 (schematically shown) such as thin film transistors or metal-insulator-metal devices. Although schematically illustrated as a rectangular region, devices 124 may be formed from multiple thin film conductors, semiconductor and dielectric layers. In the example shown, switching devices 124 provide active matrix control of electrical charge being supplied to each of pixel plates 122. In particular, switching devices 124 are actuated to control electrical charge being transmitted from circuitry layers 114 through electrical interconnect layer 116 and through one or more of charge transmitting flexures 120 to pixel plates 122. In other embodiments of modulator 74, circuitry layers 114 may include alternative or additional electronic components performing different functions. In the particular example shown, switching devices 124 are electrically connected to electrical interconnect layer 116 by electrically conductive traces 128 (schematically shown) provided by circuitry layers 114 and by electrical vias 130 electrically connecting circuitry layers 114 to electrical interconnect layer 116.

As shown by FIG. 8, electrical interconnect layer 116 comprises a layer of one or more electrically conductive materials located between circuitry layers 114 and conductive plate 118. Electrical interconnect layer 116 is spaced from circuitry layers 114 by dielectric 119. Dielectric 119 comprises one or more layers of dielectric or electrically insulating material. Dielectric 119 further extends between electrical interconnect layer 116 and conductive plate 118 as well as within breaks or openings within layer 116 or conductive plate 118 to electrically insulate distinct portions of electrical interconnect layer 116 and conductive plate 118. Accordingly to one exemplary embodiment, dielectric 119 is formed employing multiple semiconductor fabrication deposition steps using such dielectric materials as silicon dioxide. In other embodiments, dielectric 119 may be formed using other techniques and may include one or more different dielectric materials. In one particular embodiment, dielectric 119 spaces circuitry layers 114 from electrical interconnect layer 116 by about 1 micron and further spaces electrical interconnect layer 116 from conductive plate 118 by about 1 micron.

Figure 5:
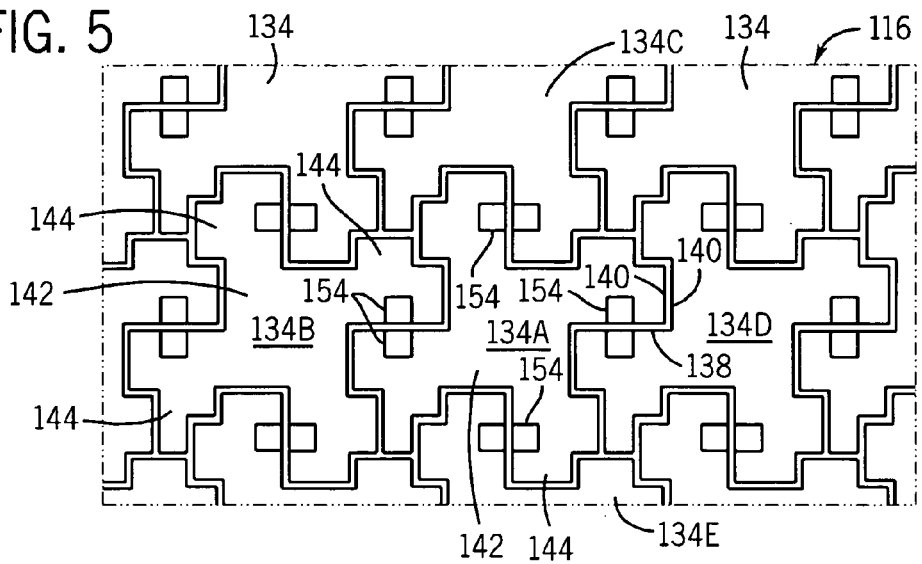
FIG. 5 is a fragmentary top plan view of an electrical interconnect layer of the light modulator of FIG. 4 according to one exemplary embodiment.

FIG. 5 is a top plan view illustrating electrical interconnect layer 116 apart from the remaining components of modulator 74. As shown by FIG. 5, electrical interconnect layer 116 is pixilated, segmented, partitioned or otherwise divided into a plurality of segments, pieces, or portions 134. Each portion 134 of interconnect layer 116 is formed from one or more electrically conductive materials such as copper, aluminum, gold or silver. Each portion 134 is electrically isolated from surrounding or adjacent portions 134. In the particular example illustrated, as shown by FIG. 5, each portion 134 is electrically isolated from adjacent portion 134 by intermediate breaks 138 between opposite boundaries 140 of consecutive portions 134. In the particular embodiment illustrated, breaks 138 comprise gaps between boundaries 140 filled with dielectric 119 such that portions 134 are electrically isolated from one another.

As further shown by FIG. 5, breaks 138 extend in a non-linear fashion between consecutive portions 134 such that each portion 134 has a non-rectangular shape. In the particular example shown, each portion 134 has a hub or central portion 142 and four outwardly projecting legs or peninsulas 144 projecting from central portion 142. As shown by FIG. 3, each central portion 142 is substantially centered with respect to an opposite corresponding pixel plate 122. Each peninsula 144 projects outwardly beyond the corresponding pixel plate 122 so as to partially project opposite another consecutive pixel plate 122. As further shown by FIG. 4, breaks 138 which define borders 140, likewise extend from opposite one pixel plate 122 to opposite another consecutive pixel plate 122. Breaks 138 further cross boundaries 140 of a pixel plate 122 on multiple sides of the pixel plate.

Figure 4:
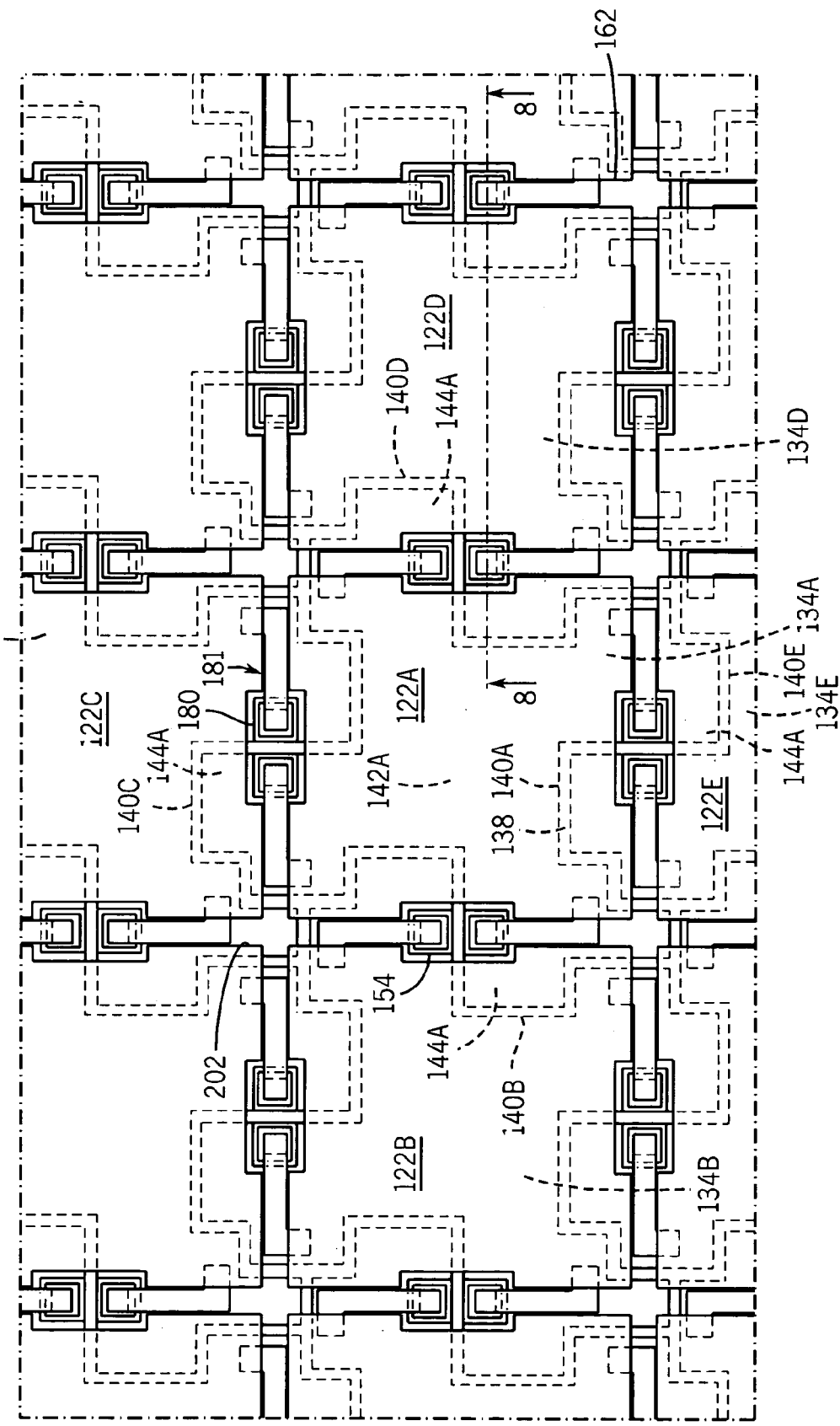
FIG. 4 is a fragmentary top plan view of the portion of the light modulator of FIG. 3 according to one exemplary embodiment.

For example, FIG. 4 illustrates pixel plate 122A which is located between pixel plates 122B, 122C, 122D and 122E. Portion 134A of electrical interconnect layer 116 lies beneath pixel plate 122A and is defined by its border 140A. Portion 134A extends next to portions 134B, 134C, 134D and 134E. Boundary 40A is electrically isolated from boundaries 40B, 40C, 40D and 40E by break 138. Portion 134A includes a central portion 142A which is centrally disposed beneath and opposite to pixel plate 122A and peninsulas 144A which project beyond pixel plate 122A opposite to pixel plates 122B, 122C, 122D and 122E. As a result, portion 134A spans across both a length and a width of pixel plate 122A. Similarly, break 138 spans across both the length and the width of pixel plate 122A.

As will be described in greater detail hereafter, the configuration of breaks 138 as well as the configuration of portions 134 provides each portion 134 with a relatively large surface area. The enlarged surface area portions 134 increases the capacitance for each pixel 44 and may improve the performance of modulator 74. Although each portion 134 is illustrated as having a jigsaw puzzle piece shape, each portion 134 may alternatively have various other shapes. Although each of portions 134 are illustrated as being substantially identical in shape to one another, portions 134 may alternatively have distinct shapes that interfit or do not interfit with one another. Although each portion 134 is illustrated as emitting any dielectric breaks within its perimeter which may lead to increased capacitance, in other embodiments, one or more of portions 134 may include dielectric breaks within their perimeters. For example, in some embodiments, one or more of portions 134 may include electrically conductive traces extending along one or more regions of each portion 134 and electrically isolated from adjacent regions of the respective portion 134 by dielectric material. Such electrical traces may be electrically connected to circuitry or electronic devices associated with circuitry layers 114 by one or more electrical vias between circuitry layers 114 and the electrical traces.

As shown by FIG. 8, each portion 134 of electrical interconnect layer 116 includes a surface 150 facing conductive plate 118. In the particular example, each portion 134 additionally includes an anti-reflective coating 152. Anti-reflective coating 152 substantially covers surface 150 and is configured to inhibit reflection of light or other electromagnetic radiation from surface 150. In the particular example illustrated, anti-reflective coating 152 comprises a layer of 600 Angstroms of undoped silicon glass (USG) topped with 80 Angstroms of TaAl. In the particular example shown, electrical interconnect layer 116 comprises Al and has a thickness of about 3,000 Angstroms. In other embodiments, anti-reflective coating 152 may comprise other anti-reflective materials, may have differing thicknesses and may be applied to only portions of surface 150. For example, anti-reflective coating 152 may alternatively be applied or otherwise formed along border 140 or only proximate to landing pads 154. In still other embodiments, anti-reflective coating 152 may be omitted.

Conductive plate 118 comprises one or more layers of electrically conductive material, such as TaAl, positioned between electrical interconnect layer 116 and pixel plates 122. In other embodiments, other materials may be used for conductive plate 118 such as a wide range of metals, alloys and intermetallics.

Figure 6:
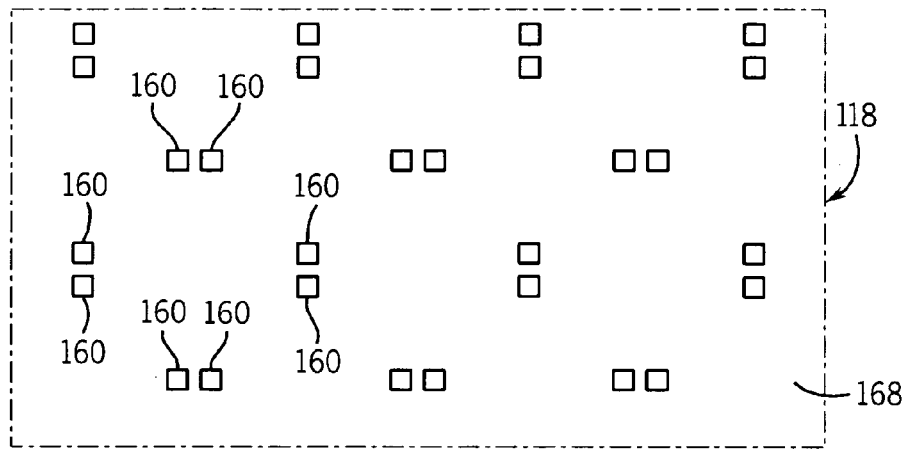
FIG. 6 is a top plan view of a conductive plate of the light modulator of FIG. 4 according to one exemplary embodiment.
Figure 7:
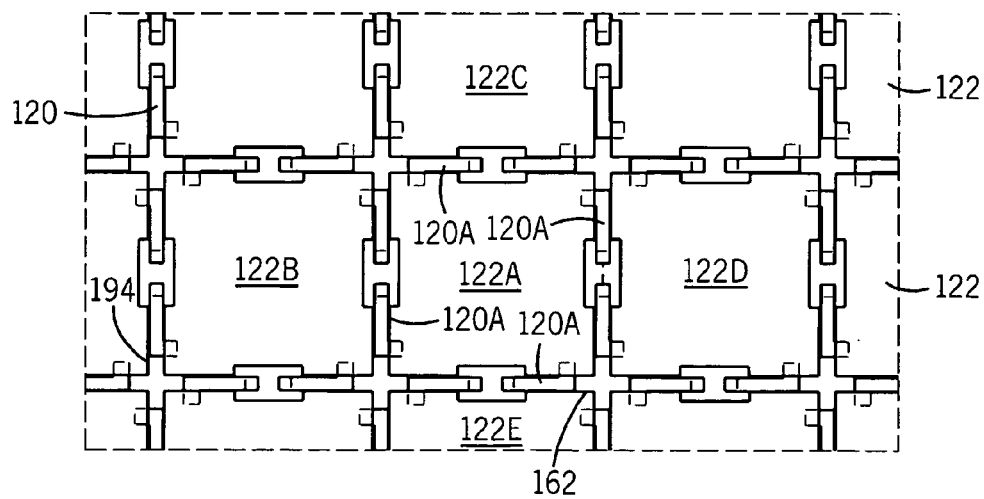
FIG. 7 is a top plan view of pixel plates and flexures of the light modulator of FIG. 4 according to one exemplary embodiment.
Figure 8:
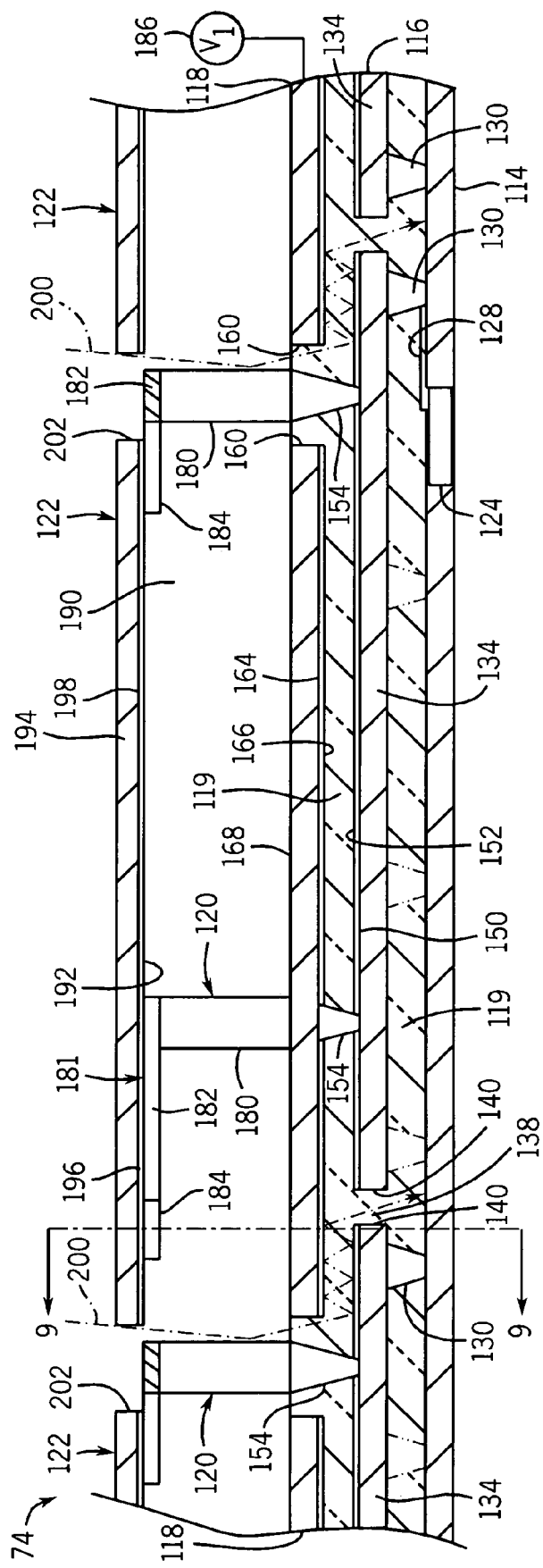
FIG. 8 is a fragmentary sectional view of the light modulator of FIG. 4 taken along line 8-8 according to one exemplary embodiment.

As shown by FIG. 6 and FIG. 7, conductive plate 118 generally comprises a single continuous plate having no breaks or gaps except for openings 160. Openings 160 extend through plate 118 and are generally sized and located for allowing passage of flexures 120 through plate 118 from flexure landing pads 154 of electrical interconnect layer 116 to pixel plates 122. Openings 160 are generally aligned with pixel plate supports 120. In the particular example illustrated, openings 160 are further aligned with gaps 162 that extend between consecutive pixel plates 122.

As shown by FIG. 8, conductive plate 118 includes a surface 164 which faces surface 150 of electrical interconnect layer 116. In the embodiment shown, surface 164 is coated with an anti-reflective coating 166. Anti-reflective coating comprises a layer of material formed or otherwise applied to surface 164 and configured to inhibit the reflection of light or other electromagnetic radiation. In the particular example shown, anti-reflective coating 166 comprises a layer of 600 Angstroms of USG topped with 80 Angstroms of TaAl. Conductor plate 118 has a thickness of about 3,000 Angstroms of Al. In other embodiments, anti-reflective coating 166 may comprise other anti-reflective materials and may have different thicknesses. Although coating 166 is illustrated as substantially covering an entirety of surface 164 of plate 118, coating 166 may alternatively be applied to selected portions of surface 164. For example, coating 166 may alternatively be applied only in those portions proximate to or about openings 160. Although conductive plate 118 is illustrated as being spaced from electrical interconnect layer 116 by a gap, in other embodiments, conductive plate 118 may alternatively be spaced from electrical interconnect layer 116 by one or more intermediate layers of insulative or dielectric materials.

In the particular embodiment illustrated in which conductive plate 118 is part of a spatial light modulator 74 such as utilized in a Fabry-Perot MEMs-based display, surface 168 of conductive plate 118 is reflective. In one embodiment, surface 168 is sufficiently reflective so as to reflect substantially all visible light. In one embodiment, surface 168 has a reflectivity of at least 90%. In other embodiments in which electronic device 110 does not comprise a spatial light modulator, surface 168 may be formed from other materials having less or no reflectivity.

Pixel plate supports 120 comprise structures configured to movably support their respective pixel plates 122 relative to conductive plate 118. In the particular example shown, each pixel plate support 120 is also electrically conductive so as to transmit charge from its associated portion 134 of electrical interconnect layer 116 to its associated pixel plate 122. Each pixel plate support 120 is formed from one or more layers of conductive materials such as TaAl. In other embodiments, supports 120 may be formed from other materials such as a wide range of metals, alloys and intermetallics.

Figure 9:
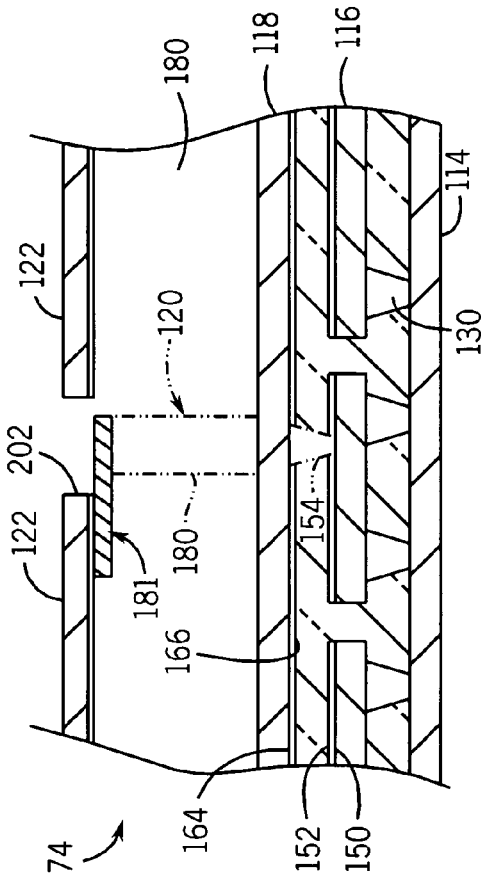
FIG. 9 is a fragmentary sectional view of the light modulator of FIG. 8 taken along line 9-9 according to one exemplary embodiment.

As shown by FIGS. 4, 8 and 9, each support 120 includes a post 180, and a flexure 181 including a flexing portion 182 and a connection portion 184. Post 180 comprises a relatively rigid portion of support 120 and is joined to flexing portion 182 of flexure 181. Post 180 generally extends from opening 160 of conductive plate 118 along gap 162 between consecutive pixel plates 122. Each post 180 is electrically connected to electrical interconnect layer 116 by an electrically conductive via 154. Post 180 supports flexing portion 182 and connection portion 184.

Flexing portion 182 comprises that portion of flexure 181 that is substantially flexible to facilitate movement of pixel plate 122. In the particular example shown, flexing portion 182 extends from post 180 along and within gap 162 between consecutive pixel plates 122. Flexing portion 182 extends substantially parallel to pixel plates 122 and supports connection portion 184.

Connection portion 184 extends from flexing portion 182 is connected to an underside of pixel plate 122. Connection portion 184 provides a landing or connection site for flexure 181. In other embodiments, connection portion 184 may alternatively be connected to pixel plate 122 from above pixel plate 122 or within a portion of pixel plate 122. In still other embodiments, connection portion 184 may have other configurations so as to be connected to pixel plate 122 in other fashions. Similarly, flexing portion 182 and post 180 may also have other configurations and locations for movably supporting each pixel plate 122.

In the particular example illustrated, support 120 is formed from TaAl. Post 180 has a height of 4000 Angstroms and thickness of one to two microns. Flexing portion 182 has a thickness of 100 Angstroms and a length of three to four microns. Connection portion 184 has a thickness of 100 Angstroms and a length of two microns. In other embodiments, each post and flexure may be formed from alternative materials and have differing shapes and/or dimensions. Although each of supports 120 is electrically conductive so as to transmit electrical charge from electrical interconnect layer 116 to pixel plates 122, in other embodiments, fewer than all of supports 120 may be electrically conductive. For example, in other embodiments, one or more of supports 120 may be formed from one or more dielectric materials or may extend from dielectric 119 without being electrically connected to electrical interconnect layer 116 by an electrically conductive via 154.

Pixel plates 122 extend as an array of plates across modulator 74. Each pixel plate 122 comprises one or more layers of electrically conductive material.

In the particular example shown in which display pixel plate 120 is part of an interference-based light modulator 74, each pixel plate 122 is semi-transparent or semi-reflective and is spaced from conductive plate 118 so as to form an optical cavity 190 between surfaces 168 and 192. As shown by FIG. 7, in one exemplary embodiment, each pixel plate 122 comprises one or more thin film stacks or layers of stiff insulating and at least partially transparent material and a thin conductive film 196 adjacent the stiff insulating layer 194. In one embodiment, layers 194 is formed from an oxide having a thickness of about one micron while the thin conductive film 196 comprises a layer of TaAl having a thickness of approximately 75 Angstroms. In other embodiments, other materials may be used to provide the reflective surface of pixel plate 122 such as Cu, Al, Ag, Au and their alloys and dielectric and metal/dielectric composite thin film stacks. In one embodiment, pixel plate 122 has a reflective surface 198 with a reflectivity of at least 90%. Movement of pixel plate 122 relative to conductive plate 118 adjusts or tunes a thickness of optical cavity 190 to vary optical interference within cavity 190 and to vary the intensity and color of light ultimately reflected from the pixel provided by pixel plate 122 and its corresponding portion of conductive plate 118.

In the particular example shown, pixel plate 122 and its reflective surface 194 are generally rectangular, and nominally square in shape. In the particular example shown, each pixel plate 122 is square with a length of 20 microns and a width of 20 microns. In other embodiments, pixel plate 122 and surface 194 may have other shapes and dimensions.

In one embodiment, surface 192 of each pixel plate 122 is spaced from surface 168 of conductive plate 118 by about 0.66 micrometers. Each pixel plate 122 has a thickness of about 1 micrometer. In other embodiments, pixel plate 122 may have a different thickness and be spaced from conductive plate 118 by different distances. In other embodiments in which pixel plate 122 is not employed as part of a defraction-based light modulator, pixel plate 122 and conductive plate 118 may be formed from other materials which are not reflective, which are opaque or which have differing degrees of reflectivity.

In operation, conductive plate 118 is biased to a first voltage by a voltage source 186 (schematically illustrated) which is electrically coupled to an outer peripheral portion of conductive plate 118 outwardly beyond at least a majority of pixel plates 122. Each individual pixel plate 122 is individually addressed by being electrically biased to a predetermined voltage by an array or active matrix of electrical switches 124 provided on circuitry layers 114. In particular, controller 138 generates control signals (electrical voltage signals) which cause the active matrix of electrical switches 124 upon circuitry layers 114 to selectively connect individual pixel plates 122 to a voltage source. Electrical current is transmitted through the electrical switches 124 through one or more vias 130, through electrical interconnect 116, and through each of supports 120 to the conductive film 192 of each pixel plate 122. The charge placed upon each individual pixel plate 122 causes each individual pixel plate 122 to be electrostatically attracted towards or repelled from conductive plate 118 which results in each individual pixel 122 being displaced relative to surface 168 of conductive plate 118 by a predetermined amount so as to establish a thickness of optical cavity 190. By varying the thickness of optical cavity 190, the resulting light emitted from each pixel 144 may also be varied so as to have an appropriate wavelength or color for display 20.

Overall, the configuration of electrical interconnect layer 116 offers several advantages such as (1) better light blocking, (2) improved pixel conductivity, (3) increased capacitance and (4) increased layout efficiency. First, the configuration of an electrical interconnect layer 116 results in improved blocking of light. As shown by FIG. 7, in some embodiments, light 200 may pass between pixel plates 122 through openings 160 and conductive plate 118 and potentially through breaks 138 and interconnect layer 116 onto circuitry layers 114. This light or illumination of circuitry layers 114 may cause circuitry layers 114 and electronic devices provided by regions of circuitry layers 114, such as switches 124, to not perform as intended. For example, unintended illumination of circuitry layers 114 may induce excessive carriers which may cause leakage, latchup or diminished electrical performance. Because breaks 138 and electrical interconnect layer 116 do not generally coincide with openings 160 in conductive plate 118 or the openings 202 between pixel plates 122, light is more effectively blocked or attenuated prior to reaching circuit layer 114. Because breaks 138 cross openings 202 between pixel plates 122, light passing through openings 202 of pixel plate 122 must travel further prior to reaching breaks 138 and underlying circuitry layers 114. Because surfaces 150 and 164 include anti-reflective coatings 152 and 166, respectively, the amount of light passing through breaks 138 is even further reduced. As a result, the number induced excessive carriers which may cause leakage, latchup or other diminished electrical performance are reduced.

Second, the configuration of electrical interconnect layer 116 provides improved pixel conductivity. In many embodiments in which pixel plate 122 may include only a thin conductive film, high resistivity of the pixel plate may lead to non-uniform intra-pixel gaps. However, because each pixel plate 122 may be electrically charged through four distinct conductive paths provided by the four flexures 120, the conductivity of each pixel plate 120 is improved, lessening the possibility of a non-uniform intra-pixel gap.

Third, electrical interconnect layer 116 increases the overall capacitance of each pixel 44 to reduce gap sensitivity due to electrical leakage. As noted above, the positioning of pixel plate 122 relative to conductive layer 118 is maintained by maintaining a voltage across pixel plate 122 and conductive plate 118. After the active matrix of switches 124 couple a voltage to each pixel plate 122, causing each pixel plate 122 to move so as to achieve a desired optical cavity 180, switches 124 then decouple the voltage source from each pixel plate 122. The capacitive nature of pixel plate 122 with respect to electrical interconnect 116 maintains the positioning of pixel plate 122 until the voltage of pixel plate 122 may be refreshed. In enlarged arrays, the duration for which the voltage is coupled to pixel plate 122 is much less than the mechanical time constant of pixel plate 122. In other words, pixel plate 122 moves only slightly while the voltage is actively applied to pixel plate 122 and then settles to its final position after the voltage has been decoupled from pixel plate 122. Because electrical interconnect layer 116 has a large surface area opposite to and electrically isolated from conductor plate 118 and has a large surface area opposite to and electrically isolated from any conductive areas below it, such as circuitry layers 114, the capacitance of each pixel 44 is increased, reducing the sensitivity of each pixel 44 to variations due to leakage of charge and the rate at which the voltage of pixel plates 122 is refreshed.

In the particular example illustrated, each portion 134 of electrical interconnect layer 116 has a center point which extends opposite to a corresponding center point of pixel plate 122 to increase, the surface area of each portion 134 and to increase the capacitance of each pixel 44. In the particular example illustrated, each portion 134 of electrical interconnect layer 116 spans opposite edges of the corresponding pixel plate 122 to provide enhanced capacitance. In the particular embodiment illustrated, each portion 134 of electrical interconnect layer 116 has a surface 150 of at least 70 square microns and advantageously of at least one hundred square micrometers opposite the corresponding pixel plate 122. In one embodiment, 80% of the surface 150 of each portion 134 faces or extends opposite to surface 182 of pixel plate 122 that is charged by the particular portion 134. This increased surface area increases the capacitance of each pixel 44 such that the positioning of pixel plate 122 is less sensitive to charge dissipation or leakage. In one embodiment, the electrical capacitance provided between each portion 134 and its corresponding pixel plate 22 increased to 40 fF as compared to the 20 fF capacitance provided by an electrical interconnect layer 16 having an electrically isolated portion substantially limited to the size of an individual flexure landing pad.

Fourth, electrical interconnect layer 116 may result in improved layout efficiency. As shown by FIG. 6, because each portion 134 of electrical interconnect layer 116 has such a relatively large surface area in electrical communication with the one or more flexures 120, electrical interconnection between circuitry layers 114 and portion 134 of electrical interconnect layer 116 may be made using vias at any of a variety of different locations between circuitry layers 114 and electrical interconnect layer 116. This increased flexibility enables a more compact and less constrained layout. In particular embodiments, the more efficient layout provides more room under each pixel 144 to maximize designed-in explicit capacitance such as with a semi-conductor capacitor or a thin film capacitor.

Although electrical interconnect layer 116 has been illustrated and described with respect to an electronic device comprising a defractive light modulator used as part of a display, electrical interconnect layer 116 may alternatively be utilized in other micro electromechanical and nano electromechanical machines and other electronic devices. For example, electrical interconnect layer 116 may alternatively be used in other devices having portions, such as pixel plates 122 that must be separated from adjacent portions by gaps or breaks which may result in the illumination of an underlying circuitry layer. Electrical interconnect layer 116 may also be utilized in other electronic devices having portions, such as pixel plates 122, that may move relative to other portions and thus require a gap or opening through which light may pass.

Although the aforementioned has been described with reference to example embodiments, workers skilled in the art will recognize that changes may be made in form and detail without departing from the spirit and scope of the disclosure. For example, although different example embodiments may have been described as including one or more features providing one or more benefits, it is contemplated that the described features may be interchanged with one another or alternatively be combined with one another in the described example embodiments or in other alternative embodiments. Because the technology of the present invention is relatively complex, not all changes in the technology are foreseeable. The present invention described with reference to the example embodiments and set forth in the following claims is manifestly intended to be as broad as possible. For example, unless specifically otherwise noted, the claims reciting a single particular element also encompass a plurality of such particular elements.

What is claimed is:

1. An electronic device comprising:
    a first member;
    a second member;
    an electrical interconnect layer having a first electrically conductive portion and a second electrically conductive portion electrically isolated from the first electrically conductive portion;
    a conductive plate between the electrical interconnect layer and the first and second members, the conductive plate having a periphery outwardly beyond the first member, wherein the conductive plate is configured to be charged from the periphery;
    a first charge transmitting flexure extending from the first portion to the first member; and
    a second charge transmitting flexure extending from the second portion to the second member.

2. The device of claim 1, wherein the electrical interconnect layer is electrically isolated from the conductive plate.

3. The device of claim 1, wherein the first portion and the second portion are separated by a single gap.

4. The device of claim 1 including a third charge transmitting flexure extending from the first portion to the first member.

5. The device of claim 4 including a fourth charge transmitting flexure extending from the first portion to the first member.

6. The device of claim 5 including a fifth charge transmitting flexure extending from the second portion to the second member and a sixth charge transmitting flexure extending from the second portion to the second member.

7. The device of claim 5 including a fifth charge transmitting flexure extending from the first portion to the first member.

8. The device of claim 7 including a sixth charge transmitting flexure extending from the second portion to the second member.

9. The device of claim 8 including a seventh charge transmitting flexure extending from the second portion to the second member.

10. The device of claim 9 including an eighth charge transmitting flexure extending from the second portion to the second member.

11. The device of claim 4 including a fourth charge transmitting flexure extending from the second portion to the second member.

12. The device of claim 1, wherein the first member is movably supported by a total number of flexures including the first flexure and wherein each of the total number of flexures is electrically connected to the first portion.

13. The device of claim 1, wherein the conductive layer includes a total number of electrically isolated and electrically conductive portions including the first portion and the second portion, wherein the device further includes a total number of members including a first member and a second member and wherein the total number of portions is less than or equal to the total number of members.

14. The device of claim 1, wherein the first portion and the second portion are separated by a non-linear break.

15. The device of claim 1, wherein the first portion and the second portion extend side-by-side one another.

16. The device of claim 1, wherein the first member has a center point and wherein the first portion extends opposite the center point.

17. The device of claim 1, wherein the first member has a face with a first surface area and wherein the first portion has a second face facing the first face and having a second surface area of at least 80 percent of the first surface area.

18. The device of claim 1, wherein the first portion has a surface area of at least 70 square microns opposite the first member.

19. The device of claim 1, wherein the first portion is non-rectangular.

20. The device of claim 1, wherein the first member has a first edge and a second opposite edge and wherein the first portion spans the first edge and the second edge.

21. The device of claim 1 including at least one adjacent circuitry layer, wherein the electrical interconnect layer is between the circuitry layer and the conductive plate.

22. The device of claim 21, wherein the circuitry layer includes electrical switching elements.

23. The device of claim 1, wherein the first portion includes an anti-reflective coating facing the conductive plate.

24. The device of claim 1, wherein the conductive plate includes an anti-reflective coating facing the first portion.

25. The device of claim 1, wherein the first flexure passes through an opening in the conductive plate and wherein the second portion is spaced from the opening by at least one micron.

26. The device of claim 1, wherein the device comprises a light modulator.

27. The device of claim 1, wherein the first member and the second member are each semi-reflective or semi-transparent.

28. The device of claim 1, wherein the first member and the second member are configured to move relative to one another.

29. The device of claim 1, wherein the conductive plate is reflective.

* * * * *